(12) United States Patent
Seward

(10) Patent No.: US 10,422,464 B2
(45) Date of Patent: Sep. 24, 2019

(54) TENSION FIT INSULATION

(71) Applicant: Owens Corning Intellectual Capital, LLC, Toledo, OH (US)

(72) Inventor: Jason M. Seward, Dresden, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 240 days.

(21) Appl. No.: 15/279,770

(22) Filed: Sep. 29, 2016

(65) Prior Publication Data

US 2017/0097115 A1 Apr. 6, 2017

Related U.S. Application Data

(60) Provisional application No. 62/236,298, filed on Oct. 2, 2015.

(51) Int. Cl.
| | |
|---|---|
| *F16L 59/02* | (2006.01) |
| *F23J 13/02* | (2006.01) |
| *F23J 13/04* | (2006.01) |
| *F24C 15/20* | (2006.01) |
| *F16L 59/12* | (2006.01) |

(52) U.S. Cl.
CPC .......... *F16L 59/021* (2013.01); *F16L 59/028* (2013.01); *F23J 13/02* (2013.01); *F23J 13/04* (2013.01); *F24C 15/20* (2013.01); *F16L 59/12* (2013.01); *F23J 2213/10* (2013.01); *F23J 2213/101* (2013.01); *F23J 2213/40* (2013.01); *Y10T 428/24314* (2015.01)

(58) Field of Classification Search
CPC .................. F16L 59/021; F16L 59/028; B32B 428/24314

USPC .................................................. 428/131, 135
See application file for complete search history.

(56) References Cited

U.S. PATENT DOCUMENTS

| 3,825,465 A * | 7/1974 | Stock ........................ E04C 5/06 |
| | | 428/131 |
| 2013/0022783 A1 | 1/2013 | Zagorski et al. |
| 2015/0209981 A1* | 7/2015 | Baek ...................... B28B 3/126 |
| | | 264/319 |

FOREIGN PATENT DOCUMENTS

| DE | 19509892 | 9/1996 |
| EP | 1020678 | 7/2000 |
| FR | 2383587 | 10/1978 |
| GB | 1137121 | 12/1968 |
| GB | 2515332 | 12/2014 |

OTHER PUBLICATIONS

Search Report from European Application No. 16191826.3 dated Feb. 24, 2017.
Communication pursuant to Article 94(3) EPC from EP Application No. 16191826.3 dated May 13, 2019.

* cited by examiner

*Primary Examiner* — William P Watkins, III
(74) *Attorney, Agent, or Firm* — Calfee, Halter & Griswold LLP

(57) ABSTRACT

An exemplary insulator for a flue of a residential oven includes a bendable insulating body having a first end, a second end, and a bending portion. A first cut is disposed between the bending portion and the first end and a second cut is disposed between the bending portion and the second end. The first cut is expandable to form a first opening and the second cut is expandable to form a second opening.

8 Claims, 6 Drawing Sheets

TENSION FIT INSULATION

CROSS-REFERENCE TO RELATED APPLICATIONS

The present application claims the benefit of U.S. Provisional Application Ser. No. 62/236,298, filed on Oct. 2, 2015, titled TENSION FIT INSULATION, the disclosure of which is incorporated herein by reference in its entirety.

TECHNICAL FIELD

The present application relates generally to insulators for residential appliances, and more specifically to insulators for flues of residential ovens.

BACKGROUND OF THE INVENTION

Insulators for residential appliances are known to those skilled in the art. Insulators reduce the transfer of heat or sound between an appliance and the surrounding environment. Thermal insulators used in residential ovens, for example, protect cabinets surrounding the oven.

Residential ovens that burn natural gas to heat up the interior of the oven for cooking food require a flue to allow combustion products to be expelled from the oven. The ducts used for oven flues reach very high temperatures and are typically routed through tight spaces that are surrounded by cabinets. These flues can be heated by the combustion gases to around 700 degrees Fahrenheit and are insulated to protect the surrounding surfaces. A prior art insulation 100 is shown in FIG. 1. The insulator 100 surrounds a flue 102 with a collar of insulation 110 having an opening 112 that the flue 102 fits through. The insulation collar 110 can slide up and down on the flue 102 so an adhesive or fastener is required to hold the insulation in place.

SUMMARY

Exemplary embodiments of insulators for flues of residential ovens are disclosed herein.

An exemplary insulator for a flue of a residential oven includes a bendable insulating body having a first end, a second end, and a bending portion. A first cut is disposed between the bending portion and the first end and a second cut is disposed between the bending portion and the second end. The first cut is expandable to form a first opening and the second cut is expandable to form a second opening.

Another exemplary insulator for a flue of a residential oven includes a rectangular insulation blanket bendable at a bend location to form a first leg and a second leg. The first leg has a first opening and the second leg has a second opening. The second opening is substantially aligned with the first opening when the insulator is in a bent condition.

Still another exemplary embodiment of the present disclosure relates to a method for using an insulator for a flue of a residential oven. The method includes providing an insulator comprising a bendable insulating body having a first end, a second end, a bending portion, a first opening disposed between the first end and the bending portion, and a second opening disposed between the second end and the bending portion; bending the insulator along the bending portion; and inserting the flue through the first and second openings. The first and second openings are formed by expanding first and second cuts in the bendable insulating body.

BRIEF DESCRIPTION OF THE DRAWINGS

These and other features and advantages of the present invention will become better understood with regard to the following description and accompanying drawings in which.

DETAILED DESCRIPTION

Prior to discussing the various embodiments, a review of the definitions of some exemplary terms used throughout the disclosure is appropriate. Both singular and plural forms of all terms fall within each meaning.

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members, or elements. Also as described herein, the terms "substantially" and "about" are defined as at least close to (and includes) a given value or state (preferably within 10% of, more preferably within 1% of, and most preferably within 0.1% of).

Figure 1:
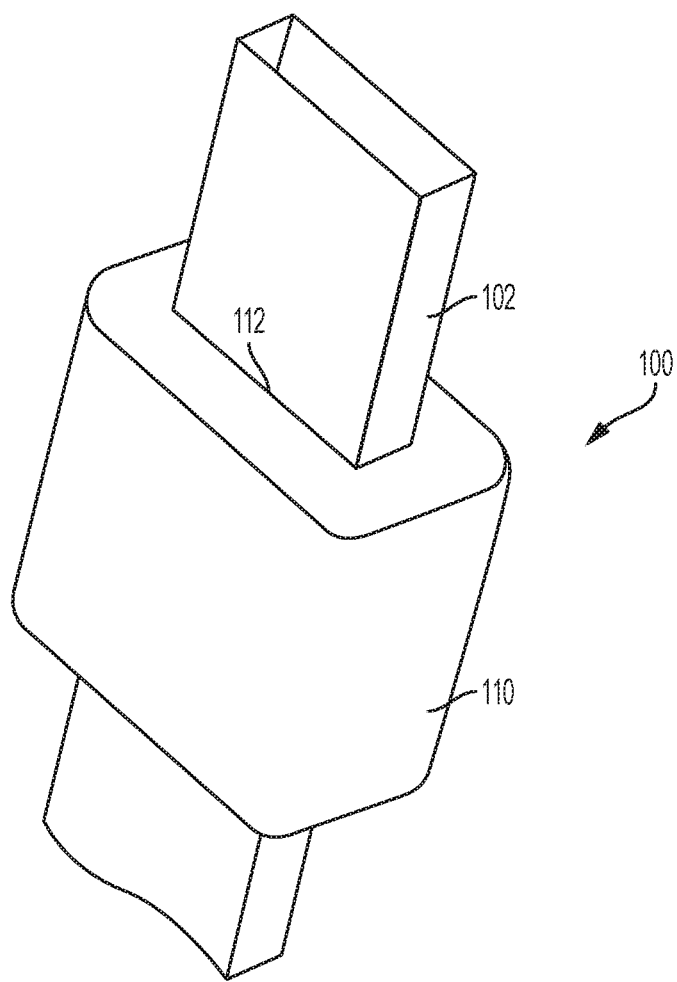
FIG. 1 shows a prior art insulator assembled to a flue.
Figure 2A:
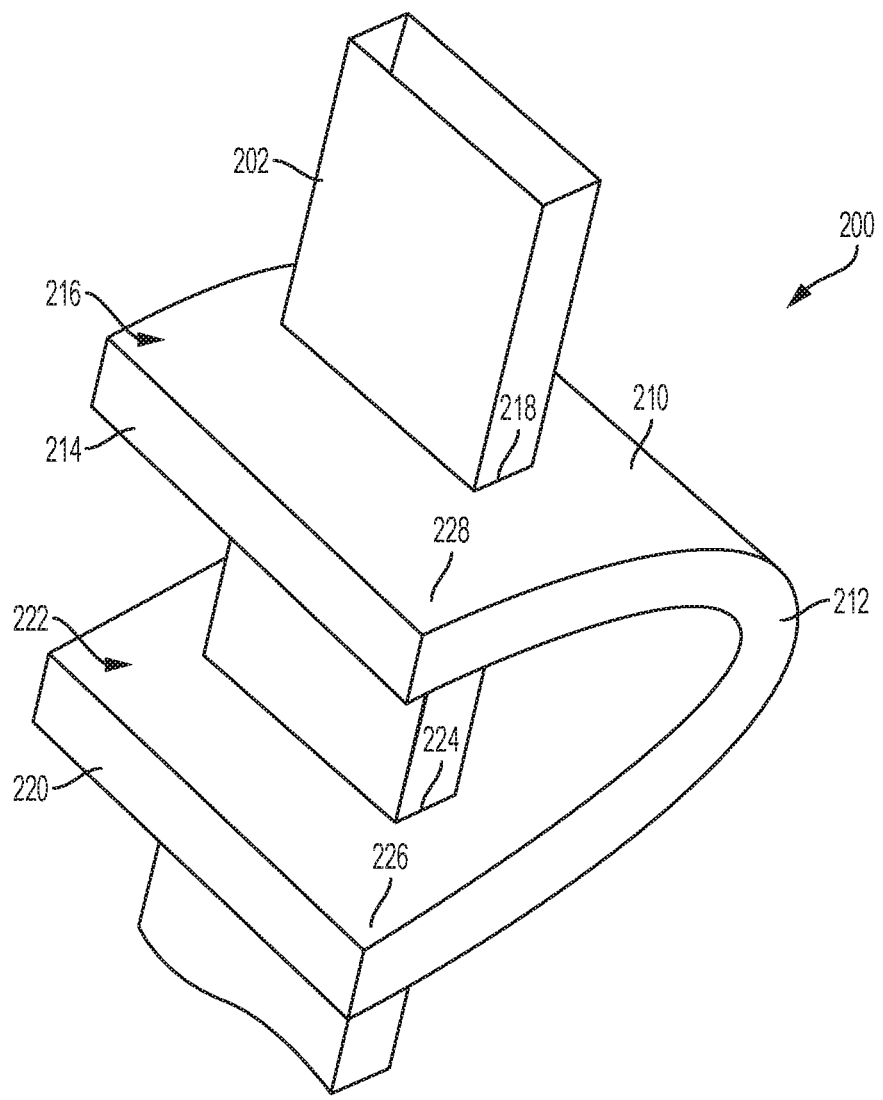
FIG. 2A is a perspective view of an exemplary insulation system assembled to a flue.

Referring now to FIG. 2A, an exemplary insulator 200 is shown. The insulator 200 protects objects surrounding a flue 202 from the hot gasses flowing through the flue 202. The insulator 200 is made from an insulation blanket 210 or any bendable insulation body that is bent at a bend or bending portion 212. A first leg 216 of the insulation blanket 210 is formed between the bend 212 and the first end 214 of the blanket 210. A second leg 222 of the blanket 210 is formed between the bend 212 and the second end 220. A first opening 218 and a second opening 224 are formed in each of the first and second legs 216, 220, respectively. In some embodiments, the insulation blanket 210 used in the insulation 200 may be formed of glass fibers, mineral fibers, or the like. In some embodiments, the insulation blanket 210 may be about 1 inch to about 3 inches thick. In some embodiments, the insulation 210 may be about 2 inches thick.

The ends 214, 220 and openings 218, 224 are substantially aligned when the insulation blanket 210 is bent at the bend 212, allowing the flue 202 to be inserted through both openings 218, 224. The bent insulation blanket 210 has an inner surface 226 and an outer surface 228. The insulator 200 is bent when it is assembled to the flue 202, thereby causing it to elastically deform. The elasticity of the material of the blanket 210 causes it to resist the bending force used to bend the insulator, resulting in an elastic force that opposes the bending force. No adhesive or fastener is needed to hold the insulator 200 in place on the flue 202 because the elastic force resisting the bending of the insulator 200 causes the insulator to grip the flue 202 at the openings 218, 224.

Figure 2B:
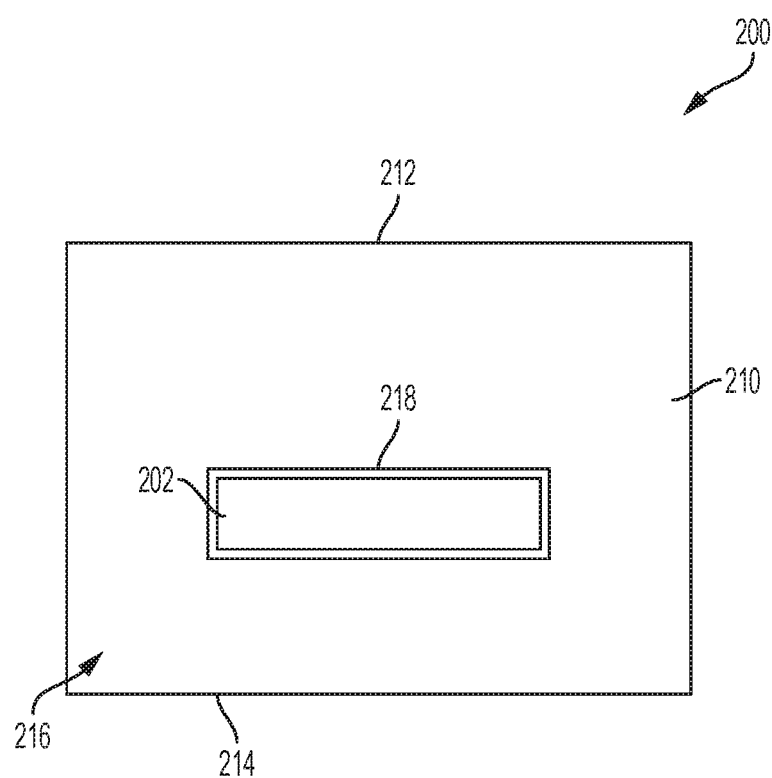
FIG. 2B is a top view of the exemplary insulation system of FIG. 2A.

Referring now to FIG. 2B, a top view of the insulator 200 is shown. The openings 218, 224 position the flue 202 in the insulator 200 so that it is surrounded by the insulation blanket 210 on all sides. The size of the insulation blanket 210 and the position of the opening 218 are selected based on the required safety distance between the flue 202 and surrounding objects. The hot gasses passing through the flue 202 heat the flue 202 to up to around 700 degrees Fahrenheit. Heat from the flue is prohibited or otherwise retarded by the insulation blanket 210 from flowing into the surrounding surfaces because the insulation blanket 210 is a poor conductor of heat.

Figure 2C:
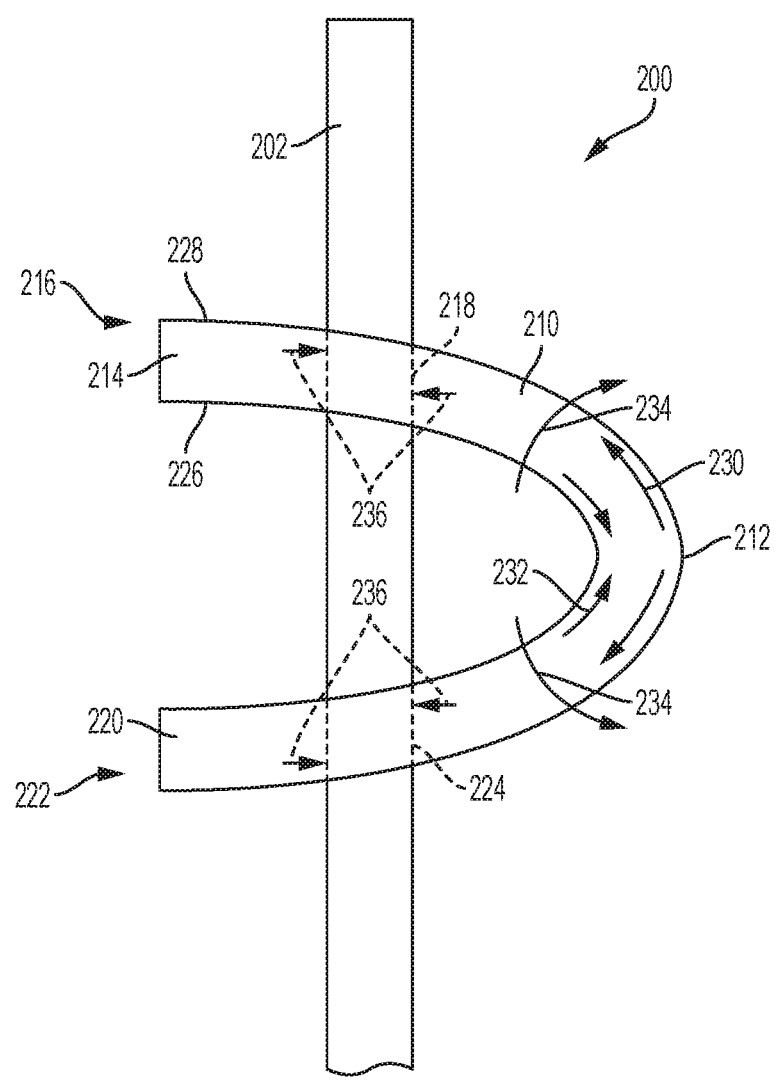
FIG. 2C is a side view of the exemplary insulation system of FIG. 2A.

Referring now to FIG. 2C, a side view of the insulator 200 is shown. Bending the insulation blanket 210 generates tensile stress 230 near the outer surface 228 and compression stress 232 near the inner surface 226. Opposing restorative forces (i.e., the elastic force) in the insulation blanket 210 resist the bending, generating straightening forces 234 that oppose the bending of the insulation blanket 210. The straightening forces 234 exerted on each leg 216, 220 of the insulation blanket 210 cause the areas of the insulation near the openings 218, 224 to be pressed against the flue 202 with gripping forces 236. The gripping forces 236 cause an increase in friction between the flue 202 and the insulation blanket 210, thereby holding the insulation blanket 210 in place along the flue 202. The magnitude of the gripping forces 236 is directed related to the elasticity of the insulation blanket 210. The friction between the flue 202 and the insulation blanket 210 is directly related to the magnitude of the gripping forces 236 and the friction coefficient of the materials used for the flue 202 and insulation.

Figure 3A:
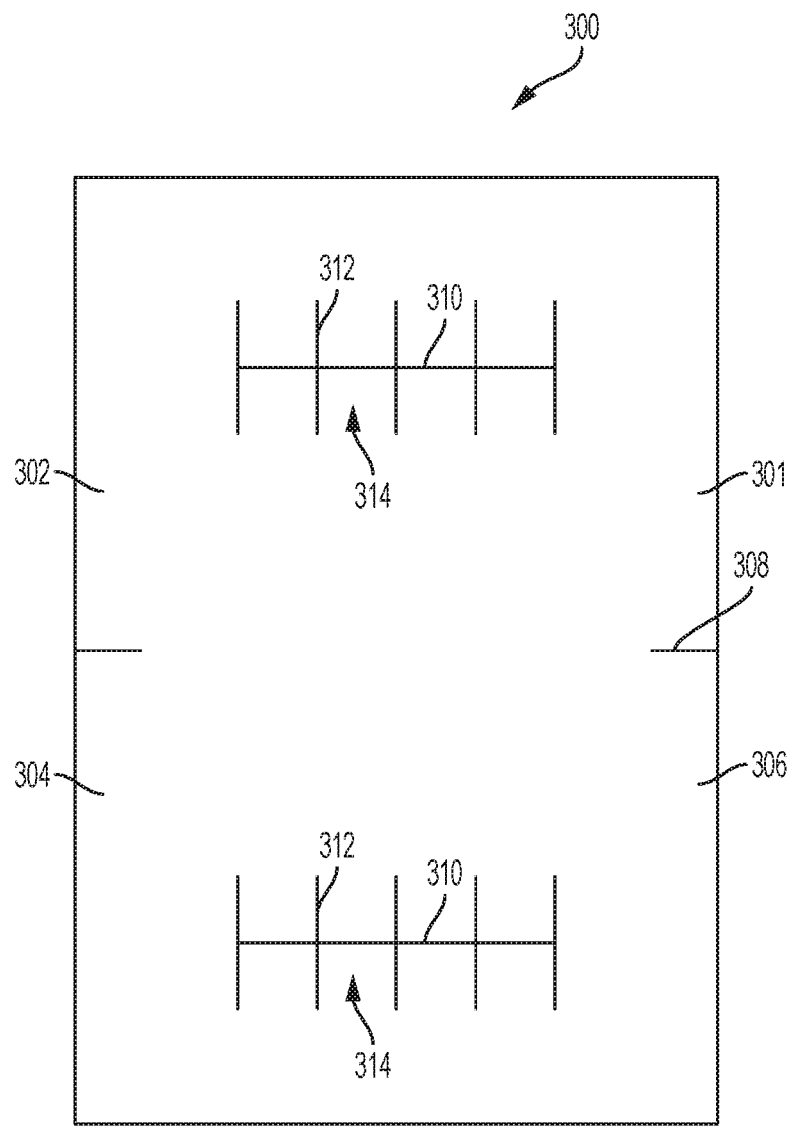
FIG. 3A is a plan view of an exemplary insulation blanket before assembly to a flue.
Figure 3B:
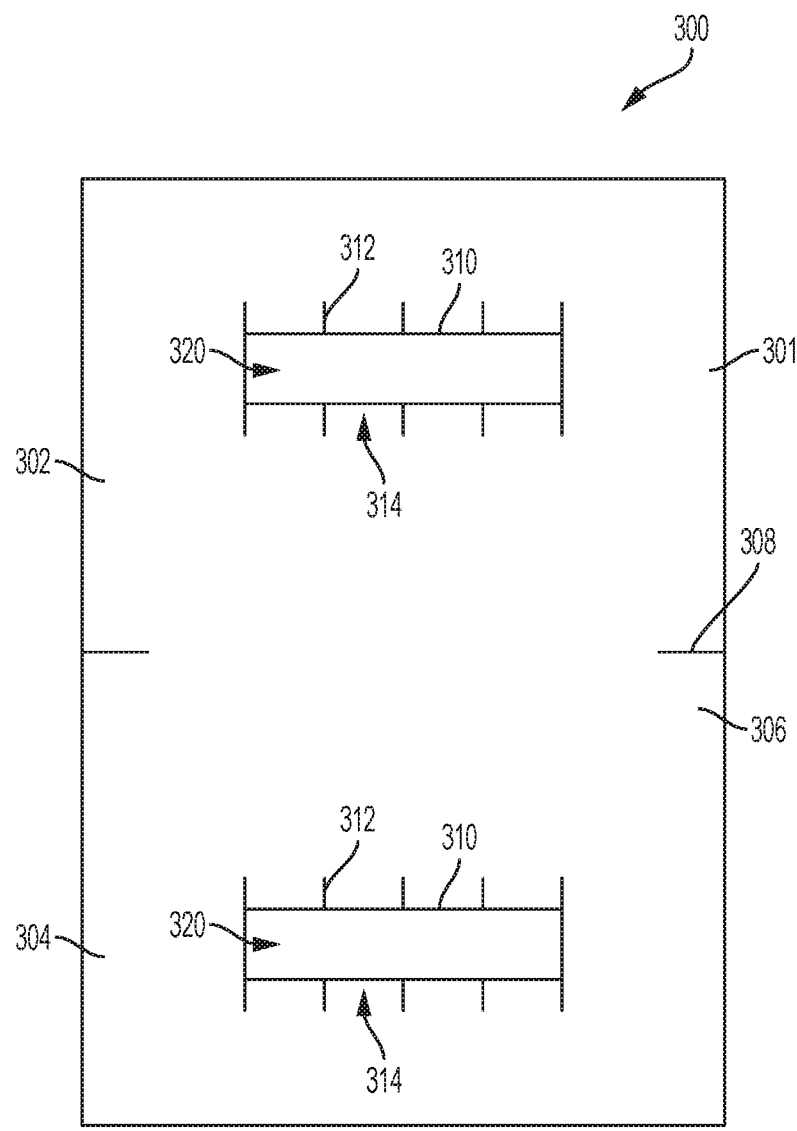
FIG. 3B is a plan view of the exemplary insulation blanket of FIG. 3A.

Referring now to FIGS. 3A and 3B, an exemplary insulator 300 for a flue (not shown) is shown in an unbent condition. The insulator 300 is generally rectangular in shape and formed of an insulation blanket 301 similar to the insulation blanket 210 described above. The insulator 300 has a first end 302, a second end 304, and a bending portion 306 between the first and second ends 302, 304. In some embodiments, the bending portion 306 may include relief cuts 308 to reduce the stiffness of the insulation blanket 301 in the area of the bending portion 306.

Flue opening cuts 310 through the first and second ends 302, 304 allow a flue (not shown) to be inserted through both ends 302, 304 of the insulator 300 when it is in a bent condition. A plurality of transverse cuts 312 intersect the opening cuts 310 creating fingers 314 of insulation material that can be compressed to create a flue opening 320 (FIG. 3B) large enough to fit accept a flue inserted through the insulator 300. The fingers 314 expand to contact the flue to provide gripping force in addition to the force supplied by the resistance to the bending of the insulator 300. In some embodiments, at least one of the fingers 314 is compressed or expanded a different amount than the other fingers 314 to accommodate variations in the size and shape of the flue. In some embodiments, the fingers 314 compress different amounts to accommodate a flue having a non-rectangular cross-section, such as, for example, an ellipse, a circle, a rounded rectangle, or any other shape suitable for a flue. In some embodiments, the opening cuts 310 are expanded or stretched open to form the flue opening 320 without the addition of any transverse cuts 312.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, alternatives as to form, fit, and function, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. Additionally, even though some features, concepts, or aspects of the disclosures may be described herein as being a preferred arrangement or method, such description is not intended to suggest that such feature is required or necessary unless expressly so stated. Still further, exemplary or representative values and ranges may be included to assist in understanding the present application, however, such values and ranges are not to be construed in a limiting sense and are intended to be critical values or ranges only if so expressly stated. Moreover, while various aspects, features and concepts may be expressly identified herein as being inventive or forming part of a disclosure, such identification is not intended to be exclusive, but rather there may be inventive aspects, concepts, and features that are fully described herein without being expressly identified as such or as part of a specific disclosure, the disclosures instead being set forth in the appended claims. Descriptions of exemplary methods or processes are not limited to inclusion of all steps as being required in all cases, nor is the order that the steps are presented to be construed as required or necessary unless expressly so stated. The words used in the claims have their full ordinary meanings and are not limited in any way by the description of the embodiments in the specification.

What is claimed is:

1. A method of assembling a thermal insulator to a flue of a residential oven, the method comprising:
    providing the thermal insulator, the thermal insulator comprising:
        a bendable insulating body formed from a plurality of fibers, the bendable insulating body having a first end, a second end, and a bending portion;
        a first cut disposed between the bending portion and the first end; and
        a second cut disposed between the bending portion and the second end;
        wherein the first cut is expandable to form a first opening; and
        wherein the second cut is expandable to form a second opening;
    bending the thermal insulator along the bending portion; and
    inserting the flue through the first and second openings.

2. The method of claim 1, wherein the bendable insulating body is rectangular.

3. The method of claim 1, wherein the fibers are glass.

4. The method of claim 1, wherein the first and second openings are substantially aligned when the bendable insulating body is in a bent condition.

5. The method of claim 1, wherein the bendable insulating body has a thickness in a range of about 1 inch to about 3 inches.

6. The method of claim 1, wherein the bendable insulation body has a thickness of about 2 inches.

7. The method of claim 1, wherein the thermal insulator comprises a first plurality of transverse cuts across the first cut and a second plurality of transverse cuts across the second cut.

8. The method of claim 1, wherein the flue contacts at least a portion of the first opening, wherein the flue contacts at least a portion of the second opening, and wherein the flue does not contact the bending portion.

* * * * *